US006216069B1

(12) United States Patent
Goudie et al.

(10) Patent No.: US 6,216,069 B1
(45) Date of Patent: Apr. 10, 2001

(54) HIDDEN ACQUISITION MODULE FOR ACQUIRING DATA FROM A VEHICLE

(75) Inventors: Greg P. Goudie, Sterling Heights; M. S. Mahadevappa; Robert C. Wind, both of Canton, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/266,139

(22) Filed: Mar. 10, 1999

(51) Int. Cl.[7] .......................... G06F 17/00; G01M 15/00
(52) U.S. Cl. .............................. 701/36; 307/10.1; 369/21
(58) Field of Search .................................. 701/35, 36, 1; 307/9.1, 10.1; 369/21; 377/15, 16

(56) References Cited

U.S. PATENT DOCUMENTS

| | | | | |
|---|---|---|---|---|
| 3,916,123 | * | 10/1975 | Werner et al. | 377/15 |
| 4,608,638 | * | 8/1986 | Tsikos | 701/35 |
| 4,757,712 | * | 7/1988 | Jurca | 73/865.9 |
| 4,853,856 | * | 8/1989 | Hanway | 701/35 |
| 5,253,224 | * | 10/1993 | Doesburg | 368/10 |
| 5,526,269 | * | 6/1996 | Ishibashi et al. | 701/29 |
| 5,581,464 | * | 12/1996 | Woll et al. | 701/35 |
| 5,626,052 | | 5/1997 | Lawson . | |
| 5,652,392 | | 7/1997 | Lawson . | |
| 5,652,393 | | 7/1997 | Lawson . | |
| 5,675,505 | | 10/1997 | Trimboli . | |
| 5,675,729 | * | 10/1997 | Mehring | 714/37 |
| 5,745,864 | * | 4/1998 | Hosoe et al. | 701/35 |
| 5,754,964 | * | 5/1998 | Rettig et al. | 701/35 |
| 5,936,315 | * | 8/1999 | Lais | 307/10.1 |

* cited by examiner

*Primary Examiner*—Michael J. Zanelli
(74) *Attorney, Agent, or Firm*—Roland A. Fuller, III

(57) ABSTRACT

A data acquisition module that monitors the operation and duration of the operation of an electrical vehicle device, such as starter motor, and is readily mounted at an inconspicuous location in the vehicle. The data acquisition module stores each activation of the vehicle device and its duration in an electrical erasable programmable read-only memory to be downloaded at a future time. A microprocessor and a bank of EEPROMs are provided where the activation count is stored in the microprocessor and the duration is stored in the bank of EEPROMs. The address of a particular EEPROM is the location where an event duration is stored.

20 Claims, 3 Drawing Sheets

HIDDEN ACQUISITION MODULE FOR ACQUIRING DATA FROM A VEHICLE

BACKGROUND OF THE INVENTION

1. Field of the Invention

This invention relates generally to a data acquisition device and, more particularly, to a miniature non-volatile data acquisition module to be mounted in an inconspicuous location on a vehicle to acquire event and duration data from an electrical vehicle component for an extended period of time.

2. Discussion of the Related Art

Many vehicle components and devices are tested to insure that they operate according to predetermined specifications. It may be desirable in certain cases to monitor the operation of the vehicle component over an extended period of time, for example up to three years, to determine the number of times the device is activated and the length of each operation, to monitor device longevity and reliability. For example, it may be desirable to monitor the operation of a vehicle starter over an extended period of time to determine the number of times the vehicle starter is activated, and the duration of each start, so that the starter can be reliable for the life of the vehicle.

In order to monitor a vehicle component for an extended period of time, it would be desirable to have the monitoring device mounted at an inconspicuous location on the vehicle so that it does not interfere with the everyday operation of the vehicle. In order to allow the monitoring device to be inconspicuously mounted to the vehicle during normal vehicle operation, it is necessary that the device be small in size. Also, it would be desirable if the monitoring device would only draw a small amount of current during operation. Further, because of the length of the testing period, it is necessary that the monitoring device retain its data even if the vehicle battery is drained or removed.

Known data acquisition devices for monitoring and testing vehicle components typically are large devices that cannot be inconspicuously located in the vehicle, do not retain data if the vehicle battery is removed, are expensive, and have mechanical parts. These known data acquisition devices are thus not suitable for long term data acquisition of the type described above.

What is needed is a small, cost effective data acquisition device that is readily mounted to a vehicle in an inconspicuous location, and is capable of monitoring electrical events and their duration for a long period of time without losing data from loss of vehicle power. It is therefore an object of the present invention to provide such a data acquisition module.

SUMMARY OF THE INVENTION

In accordance with the teachings of the present invention, a hidden acquisition module (HAM) is disclosed that is compact, non-volatile, and readily mounted at an inconspicuous location in the vehicle to provide electrical monitoring of the operation of a particular vehicle component for an extended period of time. The HAM monitors the particular vehicle component, and stores each activation of the component and its duration in an electrically erasable programmable read-only memory (EEPROM) to be downloaded at a future time. In one embodiment, a microprocessor and a bank of EEPROMs are provided, where the count is stored in the microprocessor and the duration is stored in the bank of EEPROMs. The address of a particular EEPROM in the bank is the location of where an event duration is stored.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a data acquisition module for monitoring an electrical vehicle component is merely exemplary in nature, and is in no way intended to limit the invention or its applications or uses. For example, the discussion below refers to monitoring the operation of the vehicle starter motor, but as will be appreciated by those skilled in the art, the module of the present invention has a much wider application for monitoring other vehicle components, such as activation of the vehicle brakes, doors, lights, etc.

Figure 1:
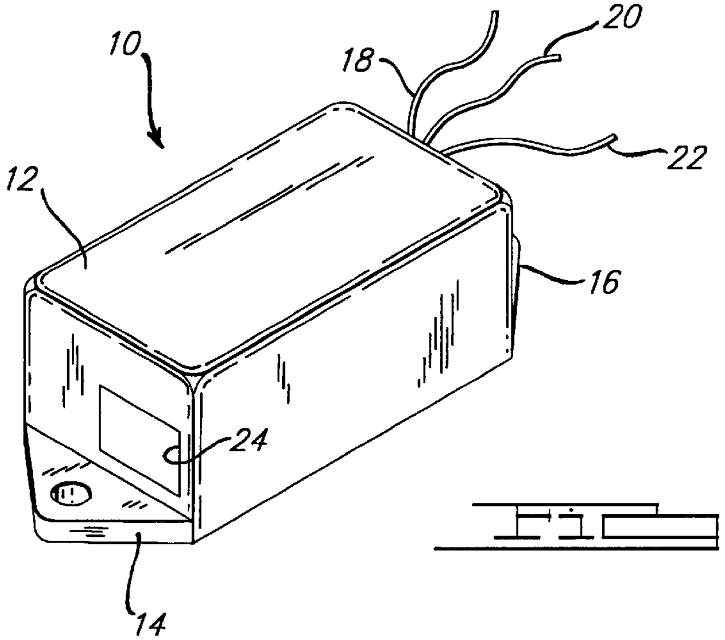
FIG. 1 is a perspective view of a data acquisition module, according to an embodiment of the present invention.

FIG. 1 is a perspective view of a hidden acquisition module (HAM) 10 for monitoring an electrical vehicle component, such as a vehicle starter motor, according to the invention. The HAM 10 includes an outer housing 12 that encloses the electrical components of the HAM 10, and a pair of mounting tabs 14 and 16 that allow the HAM 10 to be mounted by screws or the like to the vehicle at an inconspicuous location, such as under the vehicle dashboard. Three wires extend through a circular opening (not shown) in the housing 12 and are connected to the electrical circuitry within, as will be discussed below. A first wire 18 provides power to the HAM 10 from the vehicle battery, a second wire 20 is a ground connection to the HAM 10, and a third wire 22 provides the electrical data input to the HAM 10 that is connected to an electrical output of the vehicle component (not shown) being monitored. Also, an opening 24 through the housing 12 provides access to an RJ45 connector within the housing 12. In one embodiment, the housing 12 has a length of about two inches, a width of about one and a half inches and a height of about one inch. The overall length of the HAM 10 with the mounting tabs 14 and 16 is about 2.875 inches.

Figure 2:
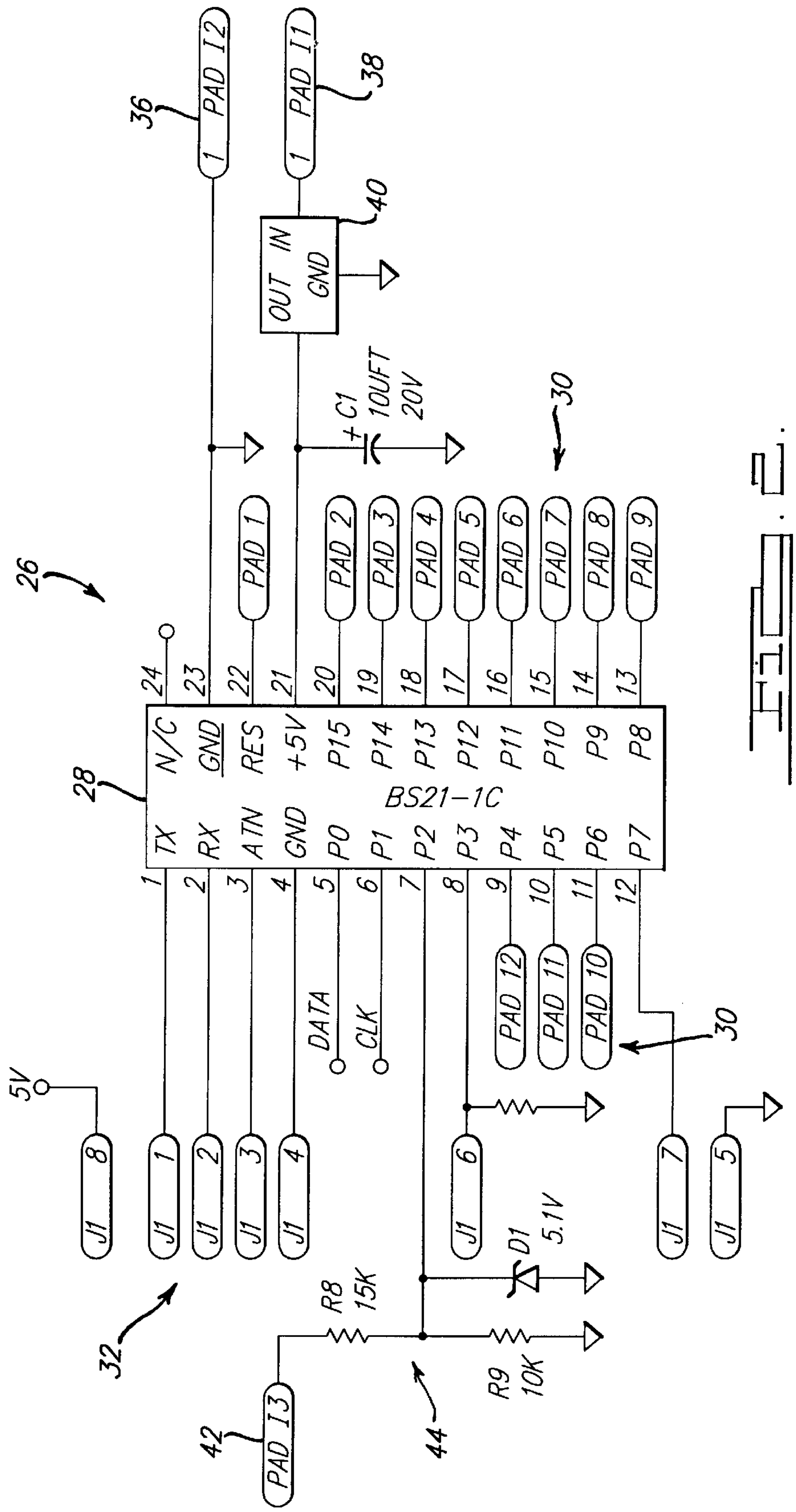
FIG. 2 is a schematic diagram showing a microprocessor and other electrical components associated with the electrical circuitry of the data acquisition module shown in FIG. 1.

FIG. 2 is a schematic diagram of an electrical circuit 26 showing some of the electrical components of the HAM 10. The electrical components including a 24-pin BS2 Stamp® microprocessor 28 that is available from Parallax, Inc. The microprocessor 28 includes a PIC processor, a voltage regulator, an electrically erasable programmable read only memory (EEPROM), a crystal, an RS232 interface chip and other electrical support components, as is known in the art. Each pin is labeled, where pins 5–20 are input/output ports P0–P15. Pins 9–11 and 13–20 are connected to electrical pads 30, and are unused input/output ports in this embodiment. Pin 22 is a reset port that resets the microprocessor 28 and pin 24 is not connected.

In one embodiment, the HAM 10 is programmed using PBASIC commands. The program is downloaded to the EEPROM in the microprocessor 28, and may provide a no current draw until the system is activated, or if continuous monitoring is done, power saving features of the microprocessor 28 may be used to reduce the power consumption. The microprocessor 28 clocks each event occurrence with a resolution of 0.1 seconds, in one embodiment. The spare input/output ports at pins 9–11 and 13–20 can be programmed to provide serial communications to other microprocessors, serial memory or monitor other points of interest. Programming highlights of the microprocessor 28 include sleep functions, pulse in/out, pulse width modulation, button debounce, shift in/out, RC time constant, sound, and EEPROM access.

Pins 1–4 are for a dedicated serial port and are connected to pins 1–4 of an eight pin RJ45 connector (see FIG. 4) at electrical pads 32, labeled J1 1–8. The RJ45 connector is used to program the microprocessor 28 through pins 1–4, where the program is stored in the EEPROM on the microprocessor 28, and can be electrically erased and reprogrammed as desired. Pin 12 of the microprocessor 28 is connected to pin 7 of the RJ45 connector, and is the output port from the microprocessor 28 that the data is retrieved from the HAM 10, as will be discussed below. Pin 6 of the RJ45 connector is connected to pin 8 of the microprocessor 28, and is an indication input to tell the microprocessor 28 to output the stored data. When pin 8 of the microprocessor 28 goes high, the data is output at pin 12. Pin 8 of the RJ45 connector is connected to a +5 voltage potential, and pin 5 of the RJ45 connector is connected to ground.

The wire 20 is connected to pad 36, which is connected to pin 23 of the microprocessor 28 to provide the ground connection. Wire 18 is connected to pad 38, which is connected to an input pin of a 5 V voltage regulator 40. The voltage regulator 40 regulates the input voltage from the 12 volt vehicle battery to the 5 volts that operates the HAM 10. The output pin of the voltage regulator 40 is connected to a capacitor C1 and pin 21 of the microprocessor 28. If the voltage of the vehicle battery varies, for example, from 6 V–30 V DC, the regulator 40 provides the regulated 5 V source. The wire 22 is connected to pad 42, which is connected to a voltage divider network 44 made up of resistors R8 and R9. A zener diode D1 protects the microprocessor 28 from voltage spikes that may occur from the vehicle component being tested. Therefore, when a high signal from the vehicle component being monitored is applied to the wire 22, the voltage divided signal is applied to pin 7 of the microprocessor 28. As long as the starter motor is energized, pin 7 is high. The high signal at pin 7 of the microprocessor 28 provides the data to determine event detection and duration of the vehicle function.

Figure 3:
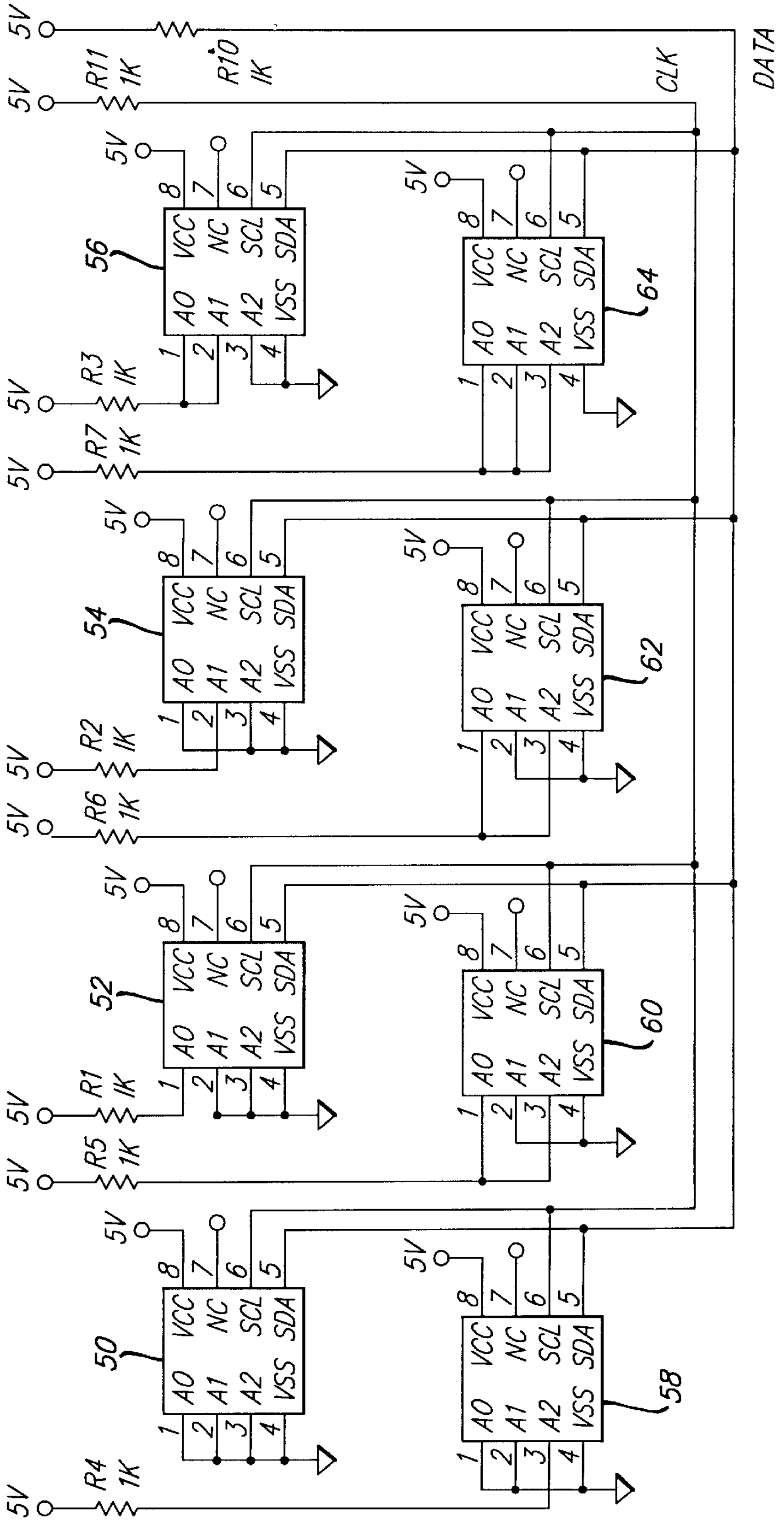
FIG. 3 is a schematic diagram of the remaining components of the electrical circuitry of the data acquisition module of the invention, including a bank of EEPROMs.

FIG. 3 is a schematic diagram of a bank of eight EEPROMs 50, 52, 54, 56, 58, 60, 62 and 64 connected in parallel and each having 8 pins. The EEPROMs 50–64 provide a 512K bit non-volatile memory that is easily addressed as one large block of 64K by 8 or any combination of 8K by 8 blocks to store data. Pin 8 of each of the EEPROMs 50–64 is connected to the 5 V potential, pin 4 of each of the EEPROMs 50–64 is connected to ground, and pin 7 of each of the EEPROMs 50–64 is not connected to anything. A data output signal at pin 5 of the microprocessor 28 is applied to pin 5 of each of the EEPROMs 50–64, and a clock signal from pin 6 of the microprocessor 28 is applied to pin 6 of each of the EEPROMs 50–64. As is apparent, each of the pins 1–3 of the EEPROMs 50–64 is connected differently to the 5 V potential and ground, where each connection of the pins 1–3 identifies the address of the particular EEPROM 50–64.

When the starter motor is activated, the signal on line 22 is voltage divided by the voltage divider 44, and applied to pin 7 of the microprocessor 28 as a high signal. The program within the microprocessor 28 continually monitors pin 7, and when pin 7 goes high, the program goes into a subroutine that provides a duration count at the programmed resolution. When pin 7 goes low indicating the end of the event, the microprocessor 28 increments an event counter to show that the event occurred. In one embodiment, for each event duration, the microprocessor 28 determines if that duration was one of the longest 25 events. If the event is longer than the last top 25 events, the microprocessor 28 will update a top 25 lists in the microprocessor's EEPROM. The actual count or the number of the event is stored in the EEPROM in the microprocessor 28, and this number represents the address of a particular EEPROM 50–64. The memory size of the EEPROM on the microprocessor 28 gives memory space for 65,535 events. When the event stops, the microprocessor 28 outputs at pin 5 the current event count as the address of the EEPROM 50–64 and the duration of the event in a serial data string. This data is received at pin 5 of each of the EEPROMs 50–64, and the EEPROM 50–64 that has the address represented by the event number stores the duration data. The count data stored in the microprocessor 28 is such that the EEPROMs 50–64 are filled with duration data in a systematic manner. Because the EEPROMs 50–64 and the EEPROM in the microprocessor 28 are non-volatile, the data is not lost if the vehicle battery is drained or removed.

When a high signal at pin 6 of the RJ45 connector is applied to pin 8 of the microprocessor 28, the program acts to reverse the process. For each event count stored in the EEPROM of the microprocessor 28, the duration of that event is downloaded from the EEPROM 50–64 having the address of that count through pin 5 of the microprocessor 28, including the top 25 longest durations.

Figure 4:
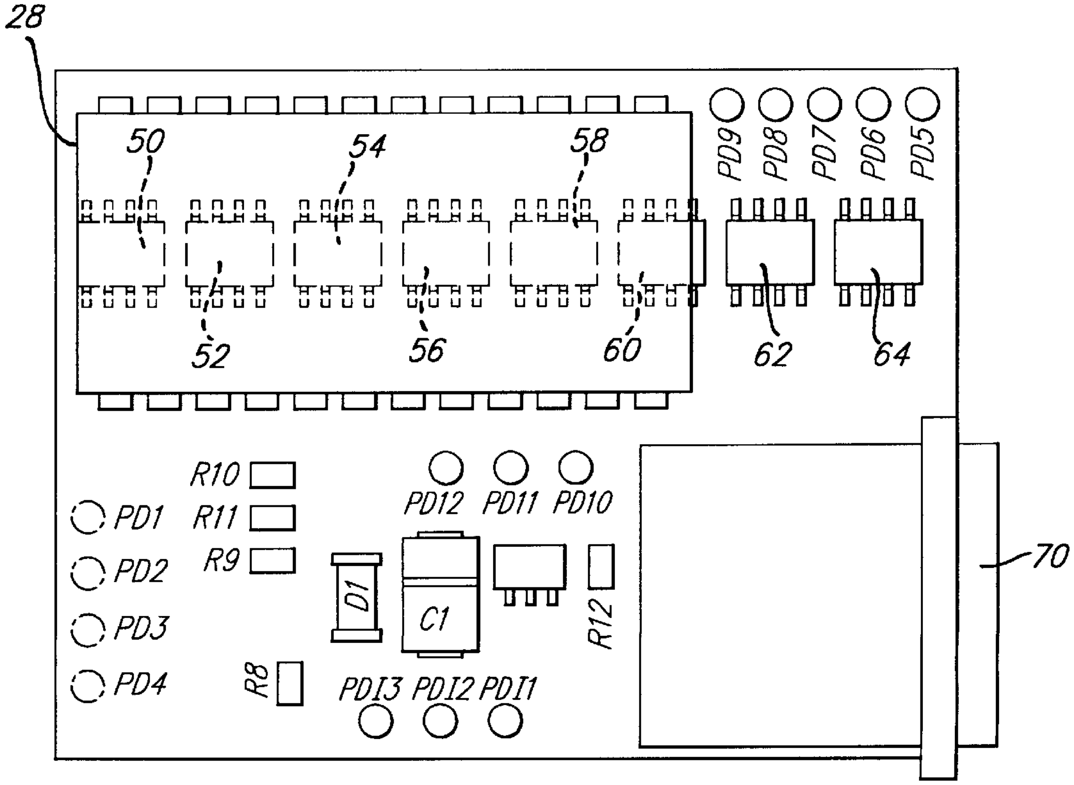
FIG. 4 is an electrical board layout of the components of the data acquisition module shown in FIG. 1.

FIG. 4 shows a top plan view of an electrical circuit board 68 on which is mounted the electrical components of the HAM 10. Each of the pads 30 (PD1–PD12) for ports 4–6 and 13–20 are provided so that these pads can be used in alternate embodiments. The pads PDI1–PDI3 are provided on the board 68 to connect the wires 18, 20 and 22. The EEPROMs 50–60 are mounted on the board 68 beneath the microprocessor 28. An RJ45 connector 70 is mounted to the board 68, and is the eight pin connector discussed above. The connector 70 is accessible through the opening 24.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A data acquisition device for a vehicle comprising:

a controller responsive to an input signal, said input signal being periodically on and off where each time the signal is on is an event, said controller including a counter providing a count of the number of events, said controller further providing a duration signal indicative of the time of each event; and at least one non-volatile memory responsive to and storing the duration signal, wherein the at least one memory is a plurality of non-volatile memories, each of the memories being separately identified by a different address where the count identifies a memory address.

2. The device according to claim 1 wherein the at least one non-volatile memory is an EEPROM.

3. The device according to claim 2 wherein the at least one memory is a bank of EEPROMs electrically connected in parallel.

4. The device according to claim 1 further including a connector, said connector providing connections to the controller to program the controller and download data from the controller.

5. The device according to claim 1 further comprising a voltage regulator, said voltage regulator applying a regulated voltage to the controller.

6. The device according to claim 1 wherein the controller is a microprocessor, said microprocessor including a non-volatile memory, said non-volatile memory in the microprocessor storing the counts.

7. The device according to claim 1 further comprising a voltage divider, said input signal being applied to the voltage divider prior to being applied to the controller, said input signal being a voltage divided input signal applied to the controller.

8. The device according to claim 1 wherein the data acquisition device acquires data from a vehicle component.

9. A data acquisition module mounted to a vehicle for monitoring the number of events and the duration of each event of an electrical vehicle device, said module comprising:

a data input circuit responsive to an electrical output signal from the vehicle device, said electrical output signal being a high signal if the vehicle device is operating and being a low signal if the vehicle device is not operating;

a controller being responsive to the electrical output from the data input circuit, said controller incrementing an event counter to identify the number of the event when the electrical output signal goes from a low signal to a high signal, said controller storing the number of the event counter in a non-volatile memory, said controller also providing a count signal of the duration that each high signal remains high during an event; and a bank of non-volatile memories responsive to the count signals from the controller, said bank of memories storing the count signals in a predetermined manner, wherein each of the memories in the bank of memories is identified by a distinct address, wherein each event number is an address of one of the memories and wherein the memories are loaded with the event duration by the memories address.

10. The module according to claim 9 wherein the bank of memories is a bank of EEPROMs electrically connected in parallel.

11. The module according to claim 9 wherein the controller is a microprocessor including an EEPROM, said EEPROM storing the number of the event counter.

12. The module according to claim 9 further including a program connector, said connector providing connections to the controller to program the controller and download data from the controller.

13. The module according to claim 9 wherein the data input circuit includes a voltage divider that divides the electrical output signal from the vehicle device.

14. The module according to claim 9 wherein the vehicle component is a vehicle starter.

15. The module according to claim 9 wherein the controller further stores a list of the longest predetermined number of events.

16. A method of acquiring data from an electrical vehicle device, said method comprising the steps of:

monitoring an output signal from the vehicle device that is indicative of the activation of the device;

storing a count of the number of times the device is activated;

storing a value of the duration of the length of time when the device is activated, said steps of storing including storing the count and value in a plurality of non-volatile memories, where each memory is separately identified by a different address and where the count identifies a memory address; and simultaneously downloading the data of the activation and the length of time the device is activated.

17. The method according to claim 16 wherein the step of storing the duration of the activation includes storing the duration in a bank of non-volatile memories.

18. The method according to claim 16 wherein the step of storing a count includes storing the count in a non-volatile memory in a microprocessor.

19. The method according to claim 16 further comprising the step of storing a duration of the longest predetermined number of events.

20. The method according to claim 19 wherein the step of storing the duration of the longest events includes storing the duration of the longest 25 events in a non-volatile memory in a microprocessor.

* * * * *